Patented Apr. 6, 1948

2,439,227

UNITED STATES PATENT OFFICE 2,439,227

TERNARY INTERPOLYMERS OF STYRENE, MALEIC ANHYDRIDE, AND ACRYLONITRILE

Raymond B. Seymour and John P. Kispersky, Dayton, Ohio, assignors to Monsanto Chemical Company, St. Louis, Mo., a corporation of Delaware No Drawing. Application December 26, 1944, Serial No. 569,908

11 Claims. (Cl. 260—78.5)

1

The present invention relates to ternary interpolymers and particularly to the interpolymerization products obtained from certain mixtures consisting of styrene, maleic anhydride and acrylonitrile. The invention also relates to methods of producing the interpolymers.

Resinous products obtained by copolymerization of styrene and maleic anhydride are well known. While valuable for many purposes, these resins are not particularly useful in the plastics industry for molding purposes, because they are soluble in alkali and react with alcohols. Resinous products obtained by interpolymerization of mixtures of styrene and acrylonitrile are also well known. Although these resins are moldable they do not possess the degree of mechanical strength and heat-resistance which is desired in many applications of plastic materials. While the mechanical strength and heat- and solvent-resistance of styrene-acrylonitrile copolymers is generally known to be increased with increasing acrylonitrile content, the heat resistance of even those styrene-acrylonitrile interpolymers that have as great an acrylonitrile content as is permissible within the limit of compatability, i. e., in the neighborhood of 30 parts by weight of acrylonitrile to 70 parts by weight of styrene, show a resistance to heat which is well below the boiling point of water. These copolymers are also readily attacked by a number of solvents to which plastic materials are frequently exposed, for example, benzene. Their mechanical properties make them unsuitable for applications requiring a high degree of tensile and flexural strength.

Accordingly, an object of the present invention is the provision of moldable synthetic resins which yield, by the ordinary compression molding methods, objects having greater mechanical strength, resistance to heat, and resistance to solvents than have been possessed by prior plastic materials. Another object of the invention is the provision of a resinous interpolymer which, by means of the application of heat, alone, develops a higher degree of insolubility, infusibility and strength than is possessed by the unheated resin.

These, and other objects which will be hereinafter disclosed, are provided by the following invention wherein styrene is submitted to polymerization in the presence of a mixture of acrylonitrile and maleic anhydride, the proportion of the three components in the polymerization mixture being held within certain well-defined limits. Resinous products obtained by interpolymerization of mixtures of styrene, acrylonitrile and maleic anhydride within the range of composition hereinafter defined are characterized by tensile and flexural strengths that exceed those of polystyrene or styrene-acrylonitrile copolymers. They are resistant to dilute alkali solutions and most of the common organic solvents. Certain compositions, particularly those having a maleic anhydride content of 20% or less are, however, soluble in acetone. However, by a heat treatment step, the solubility of these materials may be decreased. Certain of the present interpolymers, depending upon the maleic anhydride content, have a heat distortion point which is well above the boiling point of water.

We have found that when the amount of acrylonitrile is restricted to the limits ranging from 7.5% to 27.5% by weight that maleic anhydride may be incorporated therein in like amount and useful resins obtained which are resistant to the action of dilute alkali and to most organic solvents.

For the production of our new interpolymers we polymerize, by any mass or solution process, with or without the application of heat, a mixture consisting of from 45% to 85% by weight of styrene, from 7.5% to 27.5% by weight of maleic anhydride and from 7.5% to 27.5% by weight of acrylonitrile, these precent compositions being by weight of the total weight of polymerizable constituents in the mixture. As has been pointed out above, if one polymerizes a mixture of styrene and maleic anhydride, in the absence of acrylonitrile, the polymerization product resulting therefrom is not readily moldable. Furthermore, if one polymerizes mixtures of styrene and maleic anhydride in which the proportion of maleic anhydride to styrene is less than 1:1, the products are not uniformly clear due to lack of homogeneity. If mixtures of styrene and acrylonitrile are interpolymerized in the absence of maleic anhydride, the products are moldable, but they do not possess the particularly good mechanical, heat- and solvent-resistant properties as do those prepared from mixtures of styrene, maleic anhydride and acrylonitrile in the proportions herein contemplated. Acrylonitrile and maleic anhydride do not form a copolymer under the conditions used.

While the production of interpolymerization products from mixtures of styrene, maleic anhydride and acrylonitrile is surprising, even more surprising is the fact that the desirable properties mentioned above are obtainable only when the proportions of the polymerizable materials employed are adhered to within rather narrow limits. For example, the product obtained from a mixture consisting of 70 parts by weight of styrene, 5 parts of maleic anhydride and 25 parts of acrylonitrile does not differ essentially from that obtained by polymerizing a mixture consisting of 70 parts by weight of styrene and 30 parts by weight of acrylonitrile. When the proportion of maleic anhydride is increased and there is polymerized, for example, a mixture consisting of 65 parts by weight of styrene, 10 parts by weight of maleic anhydride and 25 parts by weight of acrylonitrile, the product is definitely superior, with respect to tensile and flexural strengths and heat distortion point to the 70:30 styrene-acrylonitrile interpolymer. A greater proportion of maleic anhydride has a more decided effect on the heat-distortion point, for the interpolymer obtained from 60 parts by weight of styrene, 15 parts by weight of maleic anhydride and 25 parts by weight of acrylonitrile is resistant to boiling water and at the same time possesses tensile and flexural strengths that exceed those of either polystyrene or styrene-acrylonitrile interpolymers. A further increase in heat-resistance and mechanical strength is evidenced by the interpolymers obtained from a mixture consisting of even a greater proportion of maleic anhydride; for example, the heat-distortion point of a 60:20:20 styrene-maleic anhydride-acrylonitrile product is 115° C. and that of a 60:25:15 styrene-maleic anhydride-acrylonitrile interpolymer is 111° C. As will be hereinafter shown, these interpolymers are readily molded. However, with an increased maleic anhydride content, above 27.5%, the products become more difficultly moldable. The interpolymer obtained from a mixture consisting of 50 parts by weight of styrene, 30 parts by weight of maleic anhydride and 20 parts by weight of acrylonitrile could not be satisfactorily compression molded at a temperature of 240° C. and a pressure of 3,000 p. s. i. for a period of 30 minutes. Increase of acrylonitrile to substantially above 27.5% by weight of the total mixture had the same result; an interpolymer from 50 parts by weight of styrene, 20 parts by weight of maleic anhydride and 30 parts by weight of acrylonitrile was not moldable.

The effect of the composition of the interpolymer on the heat-distortion point of the moldable ternary interpolymers is shown below:

| Composition of Interpolymer | | | Heat Distortion Point, °C. |
|---|---|---|---|
| Styrene wt. percent | Maleic Anhydride wt. percent | Acrylonitrile wt. percent | |
| 70 | 0 | 30 | 92 |
| 65 | 10 | 25 | 99 |
| 60 | 15 | 25 | 107 |
| 60 | 20 | 20 | 115 |
| 50 | 25 | 25 | >105 |
| 60 | 25 | 15 | 111 |
| 100 | 0 | 0 | 76 |

The above heat distortion points were determined by the American Society for Testing Materials Method D648–41T.

The effect of the composition on the mechanical properties of the moldable ternary interpolymers is shown below:

| Composition of Interpolymer | | | Properties | | |
|---|---|---|---|---|---|
| Styrene, wt. percent | Maleic Anhydride, wt. percent | Acrylonitrile, wt. percent | Tensile Strength, p. s. i. | Flexural Strength, p. s. i. | Rockwell Hardness |
| 100 | 0 | 0 | 5,500 | 11,000 | 75.0 |
| 70 | 0 | 30 | 8,400 | 12,000 | ---- |
| 70 | 5 | 25 | 8,400 | 12,000 | ---- |
| 65 | 10 | 25 | 9,160 | 15,600 | ---- |
| 60 | 15 | 25 | 8,800 | 18,650 | 87.5 |
| 60 | 20 | 20 | 9,250 | 17,000 | 93.0 |
| 50 | 25 | 25 | 8,950 | 18,750 | 95.5 |

The above values for tensile and flexural strengths were determined by standard methods which will be hereinafter described in the specific illustrations of the invention which follow.

The effect of the composition of various interpolymers, both without and within the claimed composition on the moldability, clarity and solubility in benzol is shown below:

| Composition of Interpolymer | | | Character of Interpolymer | Solubility in Benzol |
|---|---|---|---|---|
| Styrene, wt. percent | Maleic Anhydride, wt. percent | Acrylonitrile, wt. percent | | |
| 0 | 50 | 50 | No polymerization | |
| 100 | 0 | 0 | Moldable, clear [1] | ‡ |
| 70 | 0 | 30 | ----do [1] | ‡ |
| 50 | 50 | 0 | Not readily moldable, clear. | − |
| 70 | 30 | 0 | Not moldable, opaque | − |
| 90 | 5 | 5 | Moldable, heterogeneous. | + |
| 40 | 30 | 30 | Not moldable, opaque | − |
| 80 | 10 | 10 | Moldable, heterogeneous. | + |
| 70 | 25 | 5 | Not moldable, nonhomogeneous | − |
| 50 | 30 | 20 | Not moldable | − |
| 50 | 20 | 30 | Moldable, but brittle | − |
| 70 | 5 | 25 | Moldable, clear [1] | + |
| 70 | 10 | 20 | ----do | − |
| 60 | 15 | 25 | ----do | − |
| 60 | 25 | 15 | ----do | − |
| 60 | 20 | 20 | ----do | − |
| 50 | 25 | 25 | ----do | − |

[1] These interpolymers, while moldable and clear, do not have satisfactory heat and strength properties.

Within the limits already referred to, i. e., from 45% to 85% by weight of styrene, from 7.5% to 27.5% by weight of maleic anhydride and from 7.5% to 27.5% of acrylonitrile, the products are moldable to give clear, essentially colorless objects of outstanding mechanical strength, heat-stability and resistance to solvents.

The high heat-distortion point of our new interpolymers makes them suitable for use in many fields where polystyrene or prior copolymers of styrene cannot be employed. Objects molded of the present interpolymers maintain dimensional stability when exposed to temperatures of 100° C. to 110° C. for prolonged periods of time. Hence, the present interpolymers may be advantageously employed for the production of surgical and other instruments which require sterilizing, for objects molded therefrom have been found to be unaffected when exposed to boiling water for several hours. Unlike styrene-maleic anhydride resins, the present interpolymers are not hydrolyzed by boiling water. Objects which have been hot-molded from the interpolymers are resistant to all of the customarily employed organic solvents, for example, benzene, dioxane, ethanol, ethylene dichloride, carbon tetrachloride, 2-nitropropane, acetone, gasoline, hexane and 10% aqueous sodium hydroxide. The favorable mechanical properties of the interpolymers, together with their high heat- and solvent-resistance, recommend them for use in the manufacture of plumbing equipment, chemical containers and chemical tank lining materials, gaskets, electrical devices, optical instruments, window-glass substitutes, etc.

Upon exposure of the present interpolymers to elevated temperatures (120° C. and above) those resins having a maleic anhydride content of 20% or less become insoluble in acetone and all compositions become infusible. For example, an interpolymer made from 60 parts by weight of styrene, 20 parts by weight of maleic anhydride and 20 parts by weight of acrylonitrile, before molding is soluble in acetone, has a softening point of 145° C. and a melting point of 260° C. After molding the material by means of heat and pressure, the softening point of the molded product is raised to 164° C. and the melting point to 265° C. Instead of hot molding the material, the resin may be cast in a mold and the thermal resistivity and infusibility thereof increased merely by exposure of the material to temperatures in excess of 120° C., the time of exposure depending upon the degree of infusibility and insolubility desired.

This property of the present resinous interpolymer to become more insoluble in certain solvents such as acetone may be advantageously utilized for the production of infusible and insoluble materials from molded objects or objects produced by other techniques by heating for the length of time required to develop the degree of insolubility and infusibility which is desired.

While we do not understand the exact mechanism involved in the changes taking place during the heating of the resin, and, accordingly, do not wish to be bound by any theory, it appears that a cross-linked structure is formed by a reaction between the nitrile groups and the anhydride groups. According to this theory the individual polymeric chains apparently develop connecting linkages or bridges which may be described substantially as follows:

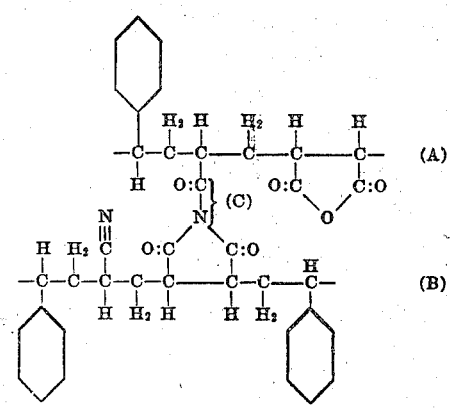

wherein (A) represents one polymeric chain containing the polymerized residues of styrene, acrylonitrile and maleic anhydride, (B) represents a second such polymeric chain, while (C) represents the cross-linking or bridging structure formed during the heat induced reaction between the nitrile and anhydride residues in the chains.

The rigidity of the polymeric structure can be increased by increasing the number of cross linkages which may be done by increasing, within the limits above set out, the number of anhydride and nitrile groups in the polymeric chain. It will be realized that ordinarily not all of the nitrile and anhydride groups react as shown above, and accordingly the cross linked polymer may contain some nitrile and anhydride groups which have not reacted. The possibility of increasing the insolubility and rigidity of the polymers merely by the application of heat makes possible the further treatment of structures after having been formed by any method for the subsequent development of insolubility and infusibility in the structure and moreover affords means by which such infusibility may be controlled to any desired degree.

The temperatures which may be utilized for the development of insolubility and infusibility in the resin range from about 120° C. or 140° C. and extend upwardly to 200° C. or 210° C. and even to as high as 250° C. As a matter of fact any temperature above 120° C., but below the decomposition point of the resin, may be employed. The time during which the temperature is applied to the polymeric material will depend upon the degree of insolubility or infusibility desired and also upon the relative content of maleic anhydride and acrylonitrile in the polymer. In general, the lower temperatures should be applied for longer periods of time, while higher temperatures require shorter times of heating.

The structures which may be fabricated from the present interpolymers comprise molded parts such as are ordinarily produced by molding utilizing heat and pressure. Cast structures may also be produced by the casting of partially polymerized fluid syrups into molds which are then further polymerized by the application of heat as described above. Where the ordinary hot molding technique is employed, the infusibility may be developed by the heat ordinarily applied during the molding operation. On the other hand, molding may be conducted at ordinary room or slightly elevated temperatures and the objects so produced subjected to the heat treatment herein described. Interesting films which are essentially clear and strong have been obtained by evaporation of an acetone solution of the copolymer containing varying amounts of plasticizer such as dibutyl phthalate.

By spinning a solution of the herein described acetone-soluble interpolymers into a suitable coagulating bath, filaments, fibers or films may be obtained. Such elongated structures may also be heat treated in the manner described above so as to render the structure additionally resistant to heat and to practically all types of solvents. Prior to or during the heat-treatment the structure may be stretched by drawing the fiber by suitable methods. A heat-resistant fiber suitable for textile purposes may thus be obtained.

Solutions of the present interpolymers dissolve in acetone and the solvent may be atomized by an air blast in such a manner that the acetone is vaporized and the resinous interpolymer recovered as fibrous, fluffy products of very low bulk density. The present fibrous products thus prepared do not retain substantial amounts of solvents, hence further processing of such fibers is carried out without the difficulty usually encountered by the presence of residual solvents, as in the case with polystyrene fibers.

The fluffy, fibrous products so obtained may be compacted by means of heat and pressure to form molded objects. It is ordinarily desirable that the consolidation during the molding operation be not carried to the point where the fibrous structure is destroyed, but such structure is desirably retained so that the orientation originally present in the fibers will impart a high impact strength to the object. In this way, molded objects of high strength, but of low density, the density ranging from 0.8 to 1.0 g./cu. cm. of resin may be obtained.

The invention is further illustrated, but not limited, by the following examples:

*Example 1*

A mixture consisting of 60 parts by weight of styrene, 20 parts by weight of acrylonitrile, and 20 parts by weight of maleic anhydride was subjected to mass polymerization in the absence of a catalyst by heating at a temperature of 70° C. for 3 days and then at a temperature of 100° C. for 2 days. In order to remove any unreacted material, the resulting, hard product was ground, dissolved in acetone and the resin precipitated by pouring the solution into alcohol. Compression molded test specimens made from the dried material were found to possess the following mechanical properties:

Tensile strength_____ 9,250 p. s. i.
Flexural strength_____ 17,000 p. s. i.
Impact strength_____ 0.02 ft. lb./0.1" of notch
Rockwell hardness_____ 87.5

The above value for tensile strength was determined on a Scott J-2 tester using compression molded tensile specimens with a 1.5" straight section in the center, the cross section of the straight portion being 0.1" x 0.5". The Scott J-2 tester was used with a cross head speed of 1" per minute.

The above value for flexural strength was determined by employing a compression molded strip measuring 0.1" x 0.5" x 2" and a model J-2 Scott tester, which tester had been modified by a special support having curved edges with a radius of 0.0625" and spaced at a distance of 1.0", the test strip being laid flat on said supports. The span/thickness ratio was >8:1, and the cross-head speed was 1" per minute.

Evaluation of the impact strength was made on compression molded strips measuring 0.5" x 0.5" x 2". These strips were notched in the manner described in the American Society for Testing Materials, Specification No. D256-41T and found on pages 339 to 342 of the American Society for Testing Materials, Book of Standards, 1941 supplement, volume III. The notched strips were tested in the standard Bell Telephone Model, Izod impact tester.

The molded test specimen was smooth, clear and essentially colorless. It was insoluble in and substantially unaffected by the following solvents: benzene, dioxane, ethanol, ethylene dichloride, carbon tetrachloride, 2-nitropropane, acetone, gasoline and hexane. It was not at all affected by 10% aqueous sodium hydroxide. When a 0.125 inch thick strip of the molded interpolymer was immersed in boiling water and held there for 10 minutes there was no apparent distortion. The heat-distortion point of the styrene-acrylonitrile-maleic anhydride ternary interpolymer of this example was found to be 115° C. as determined by the procedure given in the American Society for Testing Materials Specification D648-41T, found in the American Testing Materials Book of Standards for 1942 on page 1060, while that of polystyrene and of a styrene-acrylonitrile (70:30) interpolymer as determined by the same procedure was found to be 76° C. and 92° C., respectively.

That the product differs essentially from an interpolymer which could have been formed by copolymerization of only two components of the ternary mixture was shown as follows: When a mixture consisting of 80 parts by weight of styrene and 20 parts by weight of maleic anhydride was held at a temperature of 70° C. for a time of only 2 hours there was formed in 40% yield a very high melting, opaque, solid product which was too brittle to mold. When a mixture consisting of 70 parts of styrene and 30 parts of acrylonitrile was subjected to polymerization at a temperature of 70° C. for 3 days and then at a temperature of 100° C. for 2 days, the product had a tensile strength of 8,400 p. s. i. and a flexural strength of 12,000 p. s. i. as determined by the methods of evaluation described above. It was also soluble in benzol.

*Example 2*

A mixture consisting of 50 parts of styrene, 25 parts of maleic anhydride and 25 parts of acrylonitrile was mass polymerized in the absence of a catalyst at a temperature of 70° C. for 3 days. The resulting solid, clear, essentially colorless product was then ground and boiled with water for 2 hours in order to extract any unreacted material. Upon filtration from the water and drying of the comminuted material, it was submitted to compression molding, employing a pressure of 5,000 p. s. i., a temperature of 215° C. and a molding time of 10 minutes. Evaluation of molded test specimens thus prepared by the testing methods described above gave the following values:

Tensile strength_____ 8,950 p. s. i.
Flexural strength_____ 18,750 p. s. i.
Impact strength_____ 0.02 ft.lb./0.1" of notch
Rockwell hardness_____ 95.5
Heat-distortion point___ 105° C.

The molded test specimens were smooth, clear and essentially colorless. They were unaffected by the solvents employed in the tests described in Example 1, and an 0.125 inch thick strip of the present molded interpolymer showed no distortion after having been immersed in boiling water for 10 minutes.

While the above examples show only mass polymerization of mixtures of styrene, maleic anhydride and acrylonitrile, the present ternary interpolymers are also obtainable when mixtures of the three constituents in the proportions herein disclosed are submitted to polymerization in solution. The solutions used should be essentially water-free in order that the maleic anhydride be not converted to the acid. The present ternary interpolymers may also be employed as casting resins in the presence or absence of plasticizers; if desired the ternary mixture may be only partially polymerized and the resulting viscous product poured into casting molds, wherein the polymerization is completed. Partially polymerized syrups may also be advantageously employed as adhesives in the production of laminated products such as plywood, the sandwich of syrup and wood subsequently being exposed to heat and/or pressure for the production of the finished product. Laminated products may also be obtained by sprinkling the dried, ground interpolymer between layers of wood, paper or textile materials and then submitting the whole to a compression molding operation. Products having a smooth, glossy finish are obtained when the outside surface of the layers have also been sprinkled with the dry resin previous to molding. Either the ground interpolymer or a partially polymerized syrup may be employed with advantage as an adhesive in the preparation of abrasives.

When the interpolymers are intended for use as impregnating agents or textile stiffening or sizing agents, polymerization may likewise be brought about in situ, i. e., the textiles may be impregnated with either the monomeric mixture or the partially polymerized, viscous polymer and the subsequent polymerization carried to completion upon the surface of the textile or within the fibrous structure itself.

While the polymerizations disclosed above were conducted in the absence of a catalyst of polymerization, such catalysts may be employed and polymerization will take place at somewhat lower temperatures than in the absence of catalysts. Catalysts may also be employed when other methods of polymerization are employed, as may be appreciated by those skilled in the art. Temperatures of from, say, 30° C. to 125° C., may be generally employed.

As shown above, the hard interpolymer may readily be subjected to a purifying treatment, if desired, by boiling with water. This procedure removes any unreacted maleic anhydride and acrylonitrile. This eliminates the need of such expensive purifying steps as precipitation of a solution of the resin from organic non-solvents and yields an essentially pure product.

While the invention has been described with particular reference to certain specific embodiments, it is to be understood that it is not to be limited thereto, but is to be construed broadly and restricted solely by the scope of the appended claims.

What we claim is:

1. A resinous product consisting of interpolymerized styrene, maleic anhydride and acrylonitrile in substantially the proportions: styrene, 45% to 85% by weight; maleic anhydride, 7.5% to 27.5% by weight; and acrylonitrile 7.5% to 27.5% by weight.

2. A resinous product consisting of interpolyized styrene, maleic anhydride and acrylonitrile in substantially the proportions: styrene, 60% by weight; maleic anhydride, 20% by weight; and acrylonitrile, 20% by weight.

3. A resinous product consisting of interpolymerized styrene, maleic anhydride and acrylonitrile in substantially the proportions: styrene, 60% by weight; maleic anhydride, 25% by weight; and acrylonitrile, 15% by weight.

4. A resinous product consisting of interpolymerized styrene, maleic anhydride and acrylonitrile in substantially the proportions: styrene, 60% by weight; maleic anhydride, 15% by weight; and acrylonitrile, 25% by weight.

5. The process of forming an interpolymer by heat polymerizing a mixture consisting of styrene, maleic anhydride and acrylonitrile in substantially the proportions: styrene, 45% to 85% by weight; maleic anhydride, 7.5% to 27.5% by weight; acrylonitrile, 7.5% to 27.5% by weight.

6. The process of forming an interpolymer by heat polymerizing a mixture consisting of styrene, maleic anhydride and acrylonitrile in substantially the proportions: styrene, 45% to 85% by weight; maleic anhydride, 7.5% to 27.5% by weight; and acrylonitrile, 7.5% to 27.5% by weight, and heating said interpolymer at a temperature in excess of 120° C. but below 250° C.

7. The process of forming an interpolymer by heat-polymerizing to obtain an acetone-soluble interpolymer from a mixture consisting of: styrene, 52.5% to 85% by weight; maleic anhydride, 7.5% to 20.0% by weight; and acrylonitrile, 7.5% to 27.5% by weight; and then heating said interpolymer at a temperature in excess of 120° C., but below 250° C., until the solubility in acetone is substantially diminished.

8. The process of forming an interpolymer by heat-polymerizing to obtain an acetone-soluble interpolymer from a mixture of: styrene, 52.5% to 85% by weight; maleic anhydride, 7.5% to 20.0% by weight; and acrylonitrile, 7.5% to 27.5% by weight; and then heating said interpolymer at a temperature in excess of 140° C., but below 250° C., until the solubility in acetone is substantially diminished.

9. The process of forming an interpolymer by heat-polymerizing to obtain an acetone-soluble interpolymer from a mixture consisting of: styrene, 60% by weight; maleic anhydride, 20% by weight; and acrylonitrile, 20% by weight; and then heating said interpolymer at a temperature in excess of 120° C., but below 250° C., until the solubility in acetone is substantially diminished.

10. The process of forming an interpolymer by heat-polymerizing to obtain an acetone-soluble interpolymer from a mixture consisting of: styrene, 60% by weight; maleic anhydride, 25% by weight; acrylonitrile, 15% by weight; and then heating said interpolymer at a temperature in excess of 120° C., but below 250° C., until the solubility in acetone is substantially diminished.

11. The process of forming an interpolymer by heat-polymerizing to obtain an acetone-soluble interpolymer from a mixture consisting of: styrene, 60% by weight; maleic anhydride, 15% by weight; acrylonitrile, 25% by weight; and then heating said interpolymer at a temperature in excess of 120° C., but below 250° C., until the solubility in acetone is substantially diminished.

RAYMOND B. SEYMOUR.
JOHN P. KISPERSKY.

REFERENCES CITED

The following references are of record in the file of this patent:

UNITED STATES PATENTS

| Number | Name | Date |
|---|---|---|
| 2,047,398 | Voss et al. | July 14, 1936 |
| 2,340,110 | D'Alelio | Jan. 25, 1944 |

FOREIGN PATENTS

| Number | Country | Date |
|---|---|---|
| 549,682 | Great Britain | Dec. 2, 1942 |
| 835,357 | France | Sept. 19, 1938 |